(12) United States Patent
Mukai et al.

(10) Patent No.: US 9,467,078 B2
(45) Date of Patent: Oct. 11, 2016

(54) ROTATING ELECTRIC MACHINE DRIVER AND ELECTRIC POWER STEERING DEVICE

(71) Applicant: DENSO CORPORATION, Kariya, Aichi-pref. (JP)

(72) Inventors: Yasuhiko Mukai, Chita (JP); Hideki Kabune, Nagoya (JP)

(73) Assignee: DENSO CORPORATION, Kariya (JP)

( * ) Notice: Subject to any disclaimer, the term of this patent is extended or adjusted under 35 U.S.C. 154(b) by 64 days.

(21) Appl. No.: 14/553,074

(22) Filed: Nov. 25, 2014

(65) Prior Publication Data

US 2015/0145448 A1 May 28, 2015

(30) Foreign Application Priority Data

Nov. 26, 2013 (JP) ................................. 2013-243835

(51) Int. Cl.
*H02H 7/08* (2006.01)
*H02P 6/12* (2006.01)
*B62D 5/04* (2006.01)

(52) U.S. Cl.
CPC .............. *H02P 6/12* (2013.01); *B62D 5/0487* (2013.01); *B62D 5/0493* (2013.01); *H02P 29/0241* (2016.02)

(58) Field of Classification Search
CPC ... H02P 6/12; H02P 29/0241; B62D 5/0487; B62D 5/0493
USPC ........... 318/400.21, 434, 432, 490; 361/1, 5, 361/23; 324/123, 136
See application file for complete search history.

(56) References Cited

U.S. PATENT DOCUMENTS

| | | | | |
|---|---|---|---|---|
| 4,041,365 A | * | 8/1977 | Peak ................... | H02M 7/5155 363/136 |
| 4,334,254 A | * | 6/1982 | Baker ..................... | H02M 1/34 361/9 |
| 8,471,509 B2 | * | 6/2013 | Bonvin ................ | G11B 19/047 318/254.1 |
| 8,847,536 B2 | * | 9/2014 | Kumagai ................ | H02P 23/00 318/434 |

(Continued)

FOREIGN PATENT DOCUMENTS

| | | | | |
|---|---|---|---|---|
| JP | 5-236763 | | 9/1993 | |
| JP | 5236763 | * | 9/1993 | ............ H02M 7/537 |

(Continued)

OTHER PUBLICATIONS

Mukai et al., U.S. Appl. No. 14/553,385, filed Nov. 25, 2014.

(Continued)

*Primary Examiner* — Rita Leykin
(74) *Attorney, Agent, or Firm* — Nixon & Vanderhye PC

(57) ABSTRACT

A rotating electric machine driver apparatus and an electric power steering apparatus using the same includes a controller section that obtains a detected current value and generates a high-side instruction signal and a low-side instruction signal to switch an upper arm element and a lower arm element based on the detected current value. An abnormality detector determines a simul-OFF abnormality which is an abnormality of a pair made up of the high-side and low-side instruction signals being simultaneously switched off based on a condition that switching off of the high-side instruction signal for the upper arm element and the low-side instruction signal for the lower arm element pair continues for at least a simul-OFF abnormality determination time. In such manner, the simul-OFF abnormality of the instruction signals is detected.

7 Claims, 13 Drawing Sheets

(56) References Cited

U.S. PATENT DOCUMENTS

| | | | |
|---|---|---|---|
| 9,024,555 B2* | 5/2015 | Hirono | H02M 1/32 318/400.22 |
| 2003/0112040 A1 | 6/2003 | Yoshimura | |
| 2008/0291588 A1* | 11/2008 | Kanai | H02H 7/0838 361/23 |
| 2011/0234138 A1* | 9/2011 | Kuratani | B62D 5/0487 318/490 |
| 2012/0074885 A1 | 3/2012 | Hirono | |
| 2014/0077741 A1 | 3/2014 | Kumagai et al. | |
| 2015/0145449 A1* | 5/2015 | Mukai | H02M 1/32 318/400.22 |

FOREIGN PATENT DOCUMENTS

| | | | |
|---|---|---|---|
| JP | 5236763 A * | 11/1993 | H02M 7/537 |
| JP | 2001-086763 | 3/2001 | |
| JP | 2004-254452 | 9/2004 | |
| JP | 2007-037215 | 2/2007 | |
| JP | 2009-050059 | 3/2009 | |

OTHER PUBLICATIONS

Office Action (2 pages) dated Oct. 1, 2015 issued in corresponding Japanese Application No. 2013-243835 and English translation (4 pages).

* cited by examiner

FIG. 3

| VOLTAGE VECTOR | U | V | W | BUS LINE CURRENT |
|---|---|---|---|---|
| V0 | L | L | L | – |
| V1 | L | L | H | +Iw |
| V2 | L | H | L | +Iv |
| V3 | L | H | H | –Iu |
| V4 | H | L | L | +Iu |
| V5 | H | L | H | –Iv |
| V6 | H | H | L | –Iw |
| V7 | H | H | H | – |

ROTATING ELECTRIC MACHINE DRIVER AND ELECTRIC POWER STEERING DEVICE

CROSS REFERENCE TO RELATED APPLICATION

The present application is based on and claims the benefit of priority of Japanese Patent Application No. 2013-243835, filed on Nov. 26, 2013, the disclosure of which is incorporated herein by reference.

TECHNICAL FIELD

The present disclosure generally relates to a rotating electric machine driver and an electric power steering device using such driver.

BACKGROUND INFORMATION

Conventionally, in a rotating electric machine driver, the electric current in each of three phases is detected based on a detected electric current value of a shunt resistor that is disposed on a bus line of an inverter. For example, in a patent document 1 (i.e., Japanese Patent Publication: JP-A-2013-110864), two systems of circuits, which respectively amplify the voltage between both ends of the shunt resistor, are provided.

In the patent document 1, it is disclosed that faults and abnormalities of the current detector circuit are detected by having the two systems of circuits for amplifying the voltage between both ends of the shunt resistor.

However, the technique in the patent document 1 cannot detect the abnormalities (hereinafter "open failure") and other faults which disable a connection of the switching element in the inverter, that is, disables a switch ON of the switching element. The open failure disabling the conduction of the switching element may not only arise from an abnormality of the switching element itself but may also arise from an abnormality of an instruction signal that switches ON the switching element.

SUMMARY

It is an object of the present disclosure to provide a rotating electric machine driver that is capable of detecting an instruction signal abnormality and an electric power steering device using such driver.

In an aspect of the present disclosure, a rotating electric machine driver of the present disclosure is provided with an inverter section, an electric current detector, a controller section, and an abnormality detector.

The inverter section has an upper arm element and a lower arm element respectively corresponding to each of plural phases of a winding wire of a rotating electric machine, the upper arm element disposed on a high voltage side of the upper arm element and the lower arm element disposed on a low voltage side of the upper arm element.

The electric current detector detects an electric current supplied to the winding wire.

The controller section (i) obtains a detected current value detected by the electric current detector, and generates a high-side instruction signal and a low-side instruction signal respectively that switch an ON-OFF of the upper arm element and the lower arm element based on the detected current value.

The abnormality detector determines a simul-OFF abnormality, in which a high-side and low-side instruction signal pair for an upper arm and lower arm element pair simultaneously becomes an OFF instruction, based on continued switching-OFF of the high-side and low-side instruction signal pair continuing for at least a simul-OFF abnormality determination time.

In such a configuration, the abnormalities are appropriately detected (i.e., a simultaneous OFF of a high-side instruction signal and a low-side instruction signal, which are paired signals for a pair of switching elements, is detected).

Further, for example, if the electric current detector is disposed at a position between the inverter section and a negative side of a power supply and detects a bus line current, in case of having an open failure due to the abnormalities of an instruction signal, the phase and the direction of the power supply that correspond to the bus line current that is detected by the electric current detector may be falsely detected.

Therefore, in the present disclosure, the open failure due to the abnormalities of the instruction signal is detected by the abnormality detector. In such manner, false detection of each of the phase currents is prevented, thereby preventing an unintended behavior of the rotating electric machine.

Also, in the present disclosure, the simul-OFF abnormality determination time is longer than a dead time, during which both the upper arm element and the lower arm element are simultaneously switched to avoid a simul-ON of the upper arm element and the lower arm element. The simul-OFF abnormality determination time is also equal to or shorter than a minimum retention time, which is a duration between a start of a voltage vector period for a detection of an electric current by the electric current detector and an electric current detection timing.

Moreover, in the present disclosure, the abnormality detector determines a simul-ON abnormality, which is an abnormality caused by the high-side and low-side instruction signal pair being simultaneously switched ON based on a condition that a switching on of the high-side and low-side instruction signal pair, continues for at least a simul-ON abnormality determination time.

Even further, in the present disclosure, the rotating electric machine driver also includes a driver circuit having a signal amplifier that outputs an amplified signal to the inverter section, the amplified signal being derived from amplification of an instruction signal that is output from the controller section.

Additionally, in the present disclosure, the rotating electric machine driver further includes a protection section in the driver circuit that stops a generation of the amplified signal when both of the upper arm instruction signal and the lower arm instruction signal have an ON instruction.

Yet further, in the present disclosure, the abnormality detector is disposed in the driver circuit.

Still further, in the present disclosure, the electric current detector is disposed at a position between (i) the inverter section and (ii) a positive side or a negative side of a power source.

Moreover, in the present disclosure, the rotating electric machine driver further includes a monitor section in the controller section determining whether detection of abnormality by the abnormality detector is correctly detected.

Further, in the present disclosure, an electric power steering apparatus includes a rotating electric machine driver that outputs an assisting torque for assisting a steering operation of a driver. The rotating electric machine driver has an inverter section, an electric current detector, a controller section, and an abnormality detector.

The inverter section has an upper arm element and a lower arm element respectively corresponding to each of plural phases of a winding wire of a rotating electric machine, the upper arm element disposed on a high voltage side of the upper arm element and the lower arm element disposed on a low voltage side of the upper arm element.

The electric current detector detects an electric current supplied to the winding wire.

The controller section (i) obtains a detected current value detected by the electric current detector, and generates a high-side instruction signal and a low-side instruction signal respectively that switch an ON-OFF of the upper arm element and the lower arm element based on the detected current value.

The abnormality detector determines a simul-OFF abnormality, in which a high-side and low-side instruction signal pair for an upper arm and lower arm element pair simultaneously becomes an OFF instruction, based on continued switching-OFF of the high-side and low-side instruction signal pair continuing for at least a simul-OFF abnormality determination time.

BRIEF DESCRIPTION OF THE DRAWINGS

Objects, features, and advantages of the present disclosure will become more apparent from the following detailed description made with reference to the accompanying drawings, in which:

FIG. 3 is a diagram of a relationship between an on-off state of a switching element and a bus line current in one embodiment of the present disclosure;

DETAILED DESCRIPTION

Figure 1:
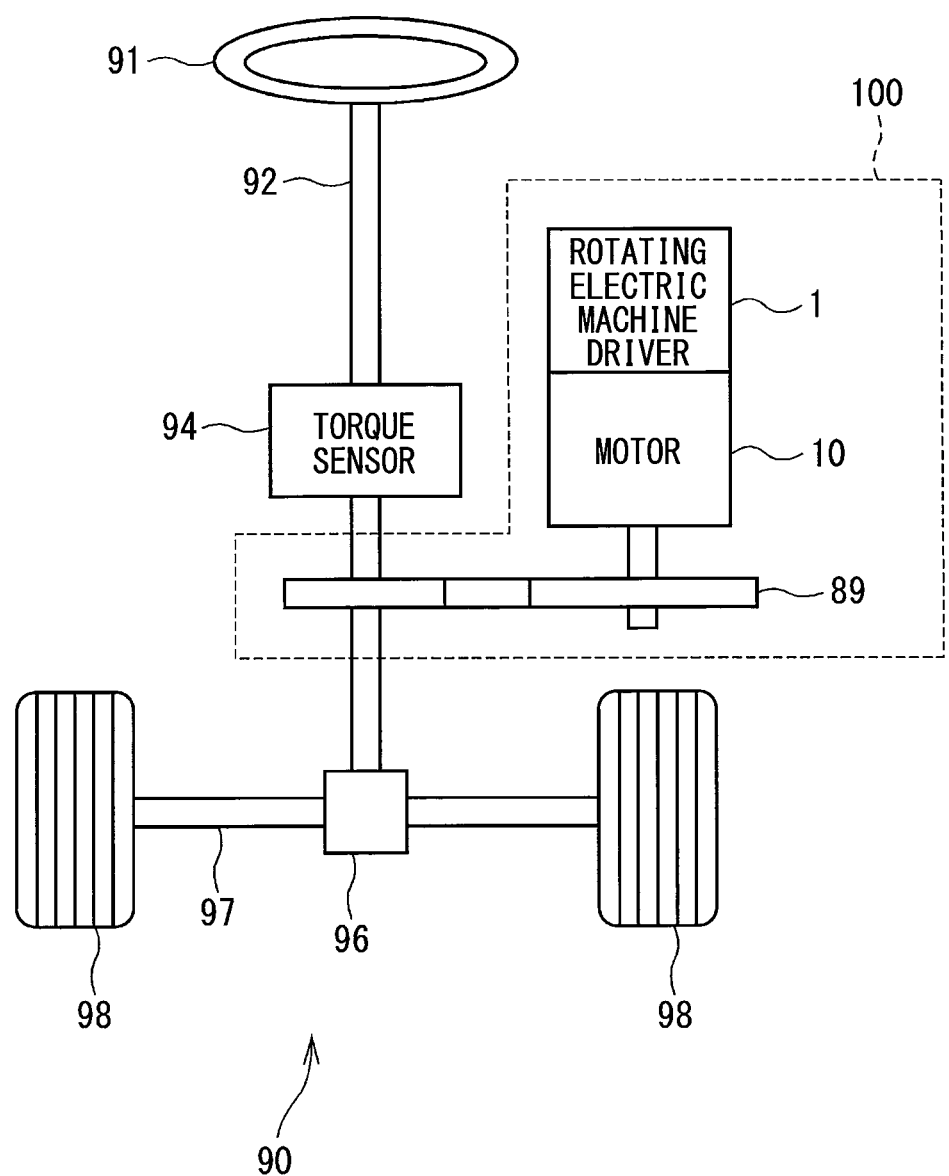
FIG. 1 is a configuration diagram of an electric power steering system in one embodiment of the present disclosure.

Hereafter, the rotating electric machine driver by the present disclosure and the electric power steering device using such driver are described based on the drawing.

One Embodiment

A rotating electric machine driver in one embodiment of the present disclosure and the electric power steering device using such driver are shown in FIGS. 1-13.

As shown in FIG. 1, a rotating electric machine driver 1 is applied to an electric power steering device 100 for assisting a steering operation of a vehicle together with a motor 10 that is provided as a rotating electric machine, for example.

FIG. 1 shows an entire configuration of a steering system 90 provided with the electric power steering device 100. The steering system 90 comprises a handle (i.e., a steering wheel) 91, a steering shaft 92, a pinion gear 96, a rack shaft 97, a wheel 98, the electric power steering device 100 and the like.

The steering wheel 91 is connected with the steering shaft 92. The steering shaft 92 has a torque sensor 94 which detects a steering torque inputted to the steering shaft 92 when a driver operates the steering wheel 91. On a tip end of the steering shaft 92, the pinion gear 96 is disposed, and the pinion gear 96 engages the rack shaft 97. On both ends of the rack shaft 97, a pair of wheels 98 are connected via a tie rod or the like.

Thereby, if the driver rotates the steering wheel 91, the steering shaft 92 connected with the steering wheel 91 rotates. A rotational movement of the steering shaft 92 is converted into a straight-line motion of the rack shaft 97 by the pinion gear 96, and the pair of wheels 98 are steered by an angle according to the displacement amount of the rack shaft 97.

The electric power steering device 100 has a speed reduction gear 89 for reducing a speed of rotation of the motor 10 and outputting the rotation to the steering shaft 92 or to the rack shaft 97, as well as the motor 10 which outputs an assist torque for assisting a steering operation of the steering wheel 91 by the driver, the rotating electric machine driver 1 which is used for a drive control of the motor 10, and the like.

The motor 10 is driven by a supply of an electric power from a battery 80 (refer to FIG. 2), and rotates the speed reduction gear 89 in a forward and backward direction.

The motor 10 is a three-phase brushless motor, and has a rotor and a stator which are not illustrated. The rotor is a cylindrical component, and a permanent magnet is attached on its surface for having a magnetic pole. The stator accommodates the rotor in its radial inside in a rotatable manner. The stator has a projection part which projects at each specified angle toward the radial inside, on which a winding wire of each of a U phase coil 11, a V phase coil 12, and a W phase coil 13 is wound. The U phase coil 11, the V phase coil 12, and the W phase coil 13 constitute a winding wire 15. In the present embodiment, an electric current in the U phase coil 11 is a U phase current Iu, an electric current in the V phase coil 12 is a V phase current Iv, and an electric current in the W phase coil 13 is a W phase current Iw. The U phase current Iu, the V phase current Iv, and the W phase current Iw may also be designated as "phase currents Iu, Iv, Iw." Further, the motor 10 has a position sensor 16 which detects an electrical angle θ which represents a rotation position of the rotor.

Figure 2:
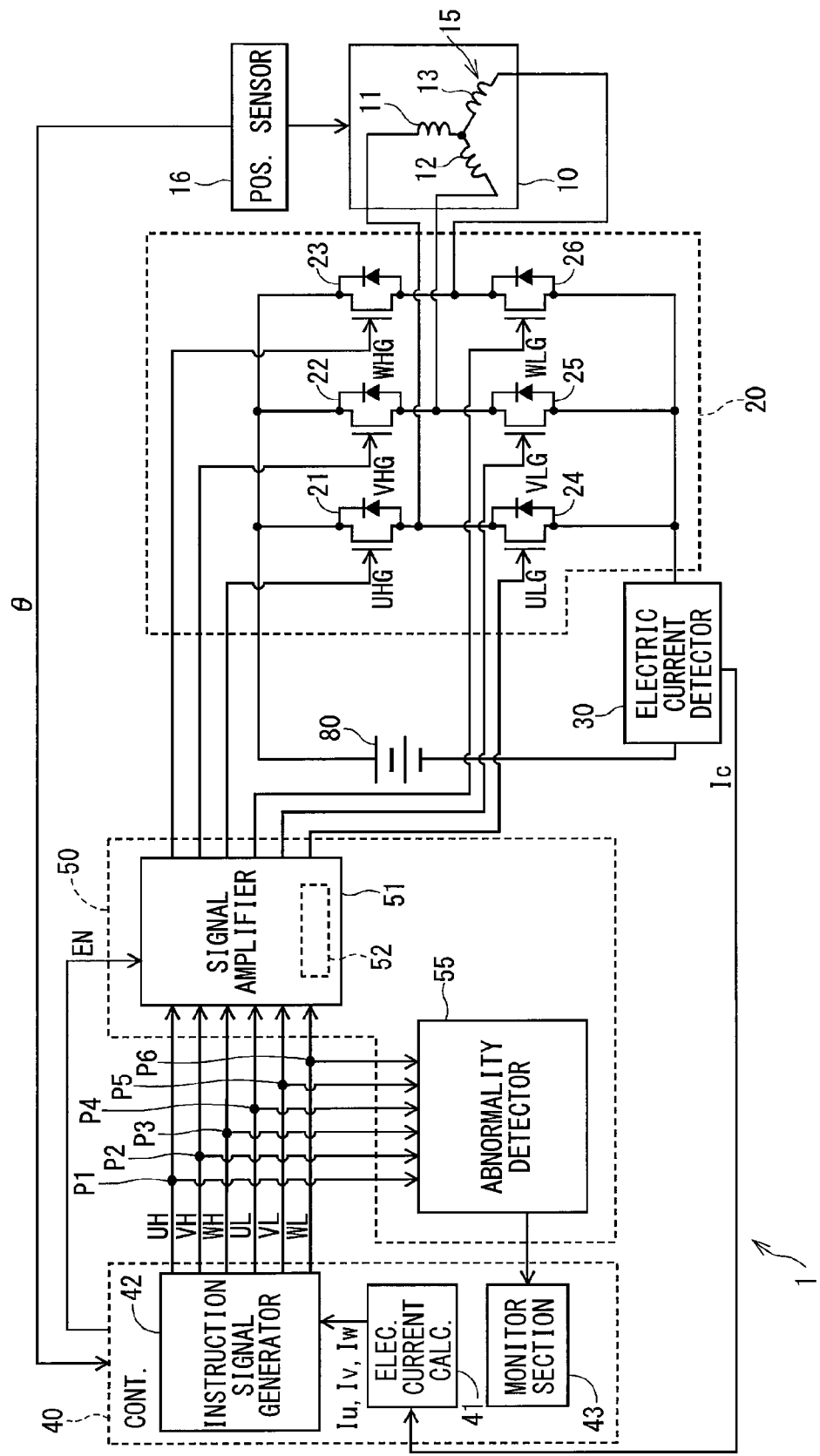
FIG. 2 is a configuration diagram of a rotating electric machine driver in one embodiment of the present disclosure.

As shown in FIG. 2, the rotating electric machine driver 1 performs a drive control of the motor 10 by pulse width modulation (i.e., "PWM"), and is provided with an inverter 20, a current detector 30, a controller 40, a custom IC 50 as a driver circuit, the battery 80 as a power supply and the like.

The inverter 20 is a three-phase inverter, and a bridge connection of the six switching elements 21-26 is provided to switch the electric current of the U phase coil 11, the V phase coil 12, and the W phase coil 13 flowing therethrough, respectively. Although the switching elements 21-26 of the present embodiment are MOSFET (i.e., metal-oxide-semiconductor field-effect transistor) which is a kind of a field effect transistor, other transistors may also be used. Hereafter, the switching elements 21-26 may be designated as "SW 21-26."

As for three SW 21-23, a drain of each of them is connected to a positive terminal of the battery 80. Further, a sauce of each of the SW 21-23 is connected to the drain of each of the SW 24-26, respectively. A sauce of each of the SW 24-26 is connected to a negative terminal of the battery 80 via the current detector 30.

A junction point of the SW 21 and the SW 24 which are paired is connected to one end of the U phase coil 11. A junction point of the SW 22 and the SW 25 which are paired is connected to one end of the V phase coil 12. A junction point of the SW 23 and the SW 26 which are paired is connected to one end of the W phase coil 13.

According to the present embodiment, in terms of wordings in the claims, the SW 21-23 connected to a high potential side correspond to an "upper arm element", and the SW 24-26 connected to the low potential side correspond to a "lower arm element."

In the following, the SW 21-23 on the high potential side may be respectively designated as the "upper arm element," and the SW 24-26 on the low potential side may be respectively designated as the "lower arm element."

The current detector 30 is disposed at a position between the low potential side of the inverter 20 and the negative terminal of the battery 80, and detects a bus line current of the inverter 20. The current detector 30 of the present embodiment is a shunt resistor. Hereafter, the current detector 30 may be designated as the "shunt resistor 30." According to the present embodiment, both ends voltage of the shunt resistor 30 is outputted to the controller 40 as a detected current value Ic, after an amplification process and a noise reduction process.

The controller 40 controls an entire rotating electric machine driver 1 as a whole, and is constituted by a microcomputer, etc. which perform various operations. The controller 40 determines the assist torque based on the steering torque detected by the torque sensor 94, vehicle speed information from a speed sensor which is not illustrated, etc., and controls the drive of the motor 10 so that the determined assist torque is outputted from the motor 10.

The controller 40 has an electric current calculator 41, an instruction signal generator 42, a monitor section 43, and the like.

The electric current calculator 41 obtains the detected current value Ic which has undergone the amplification process and the noise reduction process, and calculates each of the phase currents Iu, Iv, and Iw based on the detected current value Ic. The calculation of each of the phase currents Iu, Iv, and Iw is mentioned later.

The instruction signal generator 42 generates instruction signals UH, UL, VH, VL, WH, WL which respectively control switching on-off of the SW 21-26, based on each of the phase currents Iu, Iv, Iw, calculated by the electric current calculator 41 and the electrical angle θ obtained from the position sensor 16, together with other factors.

More practically, the instruction signal generator 42 calculates, by a PI calculation, a d axis voltage instruction value Vd* and a q axis voltage instruction value Vq* so that a deviation between (i) a d axis current instruction value Id* and a q axis current instruction value Iq* that are determined based on a torque instruction value and (ii) a d axis detected current value Id* and a q axis detected current value Iq* based on a dq conversion of each of the phase currents Iu, Iv, Iw that are derived from the detected current value Ic becomes zero. Further, each of the phase voltage instruction values Vu*, Vv*, Vw* is calculated by the inverted dq conversion of the d axis voltage instruction value Vd* and the q axis voltage instruction value Vq*, and each of the phase voltage instruction values Vu*, Vv*, Vw* is converted to each of duty instruction values Du, Dv, Dw.

Then, the instruction signal generator 42 generates the instruction signals UH, UL, VH, VL, WH, WL by comparing the duty instruction values Du, Dv, Dw with a carrier signal C. The generated instruction signals UH, UL, VH, VL, WH, WL are outputted to the custom IC 50.

The instruction signal UH is a signal concerning switching on-off of the SW 21, the SW 21 is switched on when the signal UH is an ON instruction, and the SW 21 is switched off when the signal UH is an OFF instruction. Similarly, the instruction signal VH is a signal concerning switching on-off of the SW 22, and the instruction signal WH is a signal concerning switching on-off of the SW 23. Further, the Instruction signal UL is a signal concerning switching on-off of the SW 24, the instruction signal VL is a signal concerning switching on-off of the SW 25, and the instruction signal WL is a signal concerning switching on-off of the SW 26.

According to the present embodiment, in terms of wordings in the claims, the instruction signals UH, VH, WH respectively correspond to a "high-side instruction signal," and instruction signals UL, VL, WL respectively correspond to a "low-side instruction signal." Further, the instruction signals UH and UL concerning the U phase correspond to "a high-side and low-side instruction signal pair." Similarly, the instruction signals VH and VL concerning the V phase correspond to "a high-side and low-side instruction signal pair," and the instruction signals WH and WL concerning the W phase correspond to "a high-side and low-side instruction signal pair."

When the instruction signals UH, UL, VH, VL, WH, WL are in a high level, corresponding SW 21-26 are switched ON. When the instruction signals UH, UL, VH, VL, WH, WL are in a low level, corresponding SW 21-26 are switched off. Hereafter, the instruction signals UH, UL, VH, VL, WH, WL put in a high level are respectively designated as an "ON instruction," and are shown as "1" in the drawing, and the instruction signals UH, UL, VH, VL, WH, WL put in a low level are designated as an "OFF instruction," and are shown as "0" in the drawing.

The monitor section 43 monitors the abnormalities of an abnormality detector 55.

The custom IC 50 has a signal amplifier 51 and the abnormality detector 55.

The signal amplifier 51 amplifies the instruction signals UH, UL, VH, VL, WH, WL, and generates amplified signals UHG, ULG, VHG, VLG, WHG, WLG respectively raised to a drive voltage that is capable of driving each of the SW 21-26. The generated amplified signals UHG, ULG, VHG, VLG, WHG, WLG are outputted to each the SW 21-26.

In the signal amplifier 51, when an amplification permission signal EN transmitted from the controller 40 is ON, the amplified signals UHG, ULG, VHG, VLG, WHG, WLG are generated, and the signals UHG, ULG, VHG, VLG, WHG, WLG are output to the SW 21-26. When the amplification permission signal EN is OFF, generation of the amplified signals UHG, ULG, VHG, VLG, WHG, WLG is stopped.

The amplified signal UHG is a signal concerning switching on-off of the SW 21 and the SW 21 is switched on when the signal UHG is an ON instruction, and the SW 21 is switched off when the signal UHG is an OFF instruction. Similarly, the amplified signal VHG is a signal concerning switching on-off of the SW 22, and the amplified signal WHG is a signal concerning switching on-off of the SW 23, and the amplified signal ULG is a signal concerning switching on-off of the SW 24, and the amplified signal VLG is a signal concerning switching on-off of the SW 25, and the amplified signal WLG is a signal concerning switching on-off of the SW 26.

When both of the instruction signals UH and UL are an ON instruction, in case that the amplified signals UHG, ULG that are derived by amplifying the instruction signals UH and UL are output to the inverter 20, a pair made up of SW 21 and SW 24 are simultaneously switched ON, and an excessive current may be supplied. The same may apply to the V phase and the W phase.

Therefore, the signal amplifier 51 has a self-protecting circuit 52. The self-protecting circuit 52 comprises a U phase protection circuit, a V phase protection circuit and a W phase protection circuit. The U phase protection circuit stops generation of the amplified signals UHG, ULG, when both of the instruction signals UH and UL are an ON instruction. The V phase protection circuit stops generation of the amplified signals VHG and VLG, when both of the instruction signals VH and VL are an ON instruction. The W phase protection circuit stops generation of the amplified signal WHG, WLG, when both of the instruction signals WH and WL are an ON instruction. According to the present embodiment, the self-protecting circuit 52 corresponds to a "protection section" in the claims.

The abnormality detector 55 obtains the instruction signals UH, UL, VH, VL, WH, WL outputted from the controller 40 via terminals P1-P6, and monitors the abnormalities of the instruction signals UH, UL, VH, VL, WH, WL.

Specifically, the abnormality detector 55 of the present embodiment monitors an internal abnormality of the controller 40, and also monitors a break/disconnection and a short circuit to a high/low-side along a path between the controller 40 and the terminals P1-P6 together with other abnormalities.

The abnormality detector 55 includes a U phase detector which detects the abnormalities of the U phase, a V phase detector which detects the abnormalities of the V phase, and a W phase detector which detects the abnormalities of the W phase.

The U phase detector detects the abnormalities of the instruction signals UH, UL concerning the U phase. When at least one of the instruction signals UH and UL is abnormal, a U phase abnormality flag FlgU is set.

The V phase detector detects the abnormalities of the instruction signals VH and VL concerning the V phase. When at least one of the instruction signals VH and VL is abnormal, a V phase abnormality flag FlgV is set.

The W phase detector detects the instruction signals WH and WL concerning the W phase. When at least one of the instruction signals WH and WL is abnormal, a W phase abnormality flag FlgW is set.

The information about the abnormality flags FlgU, FlgV, FlgW is transmitted to the controller 40 by a serial communication, in response to a transmission request from the controller 40.

The U phase detector includes a comparison circuit that compares the instruction signals UH and UL, a counter circuit, a flag circuit where a determination part are included U phase.

These circuits may be implemented as hardware, or may be implemented as software, or may also be implemented as a combination of hardware and software. The same applies to the V phase detector and the W phase detector.

Figure 4:
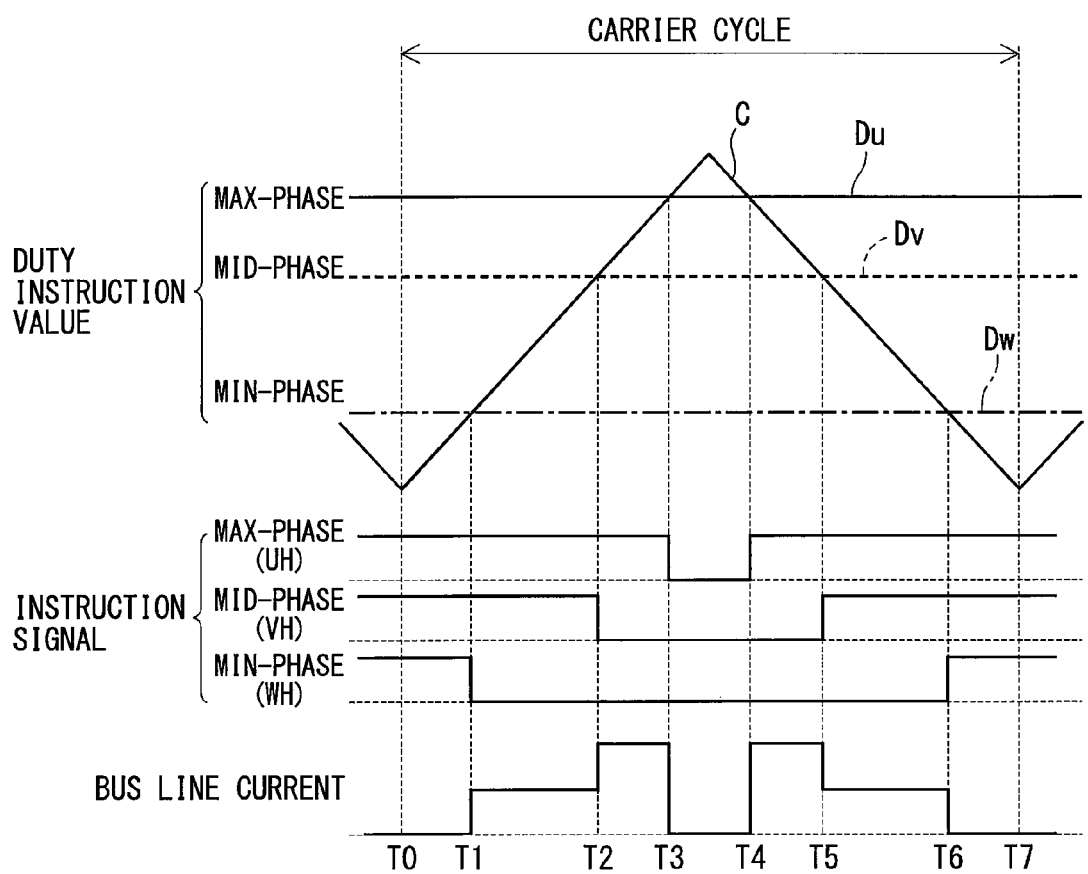
FIG. 4 is a time diagram of a relationship between an instruction signal and the bus line current in one embodiment of the present disclosure.
Figure 5:
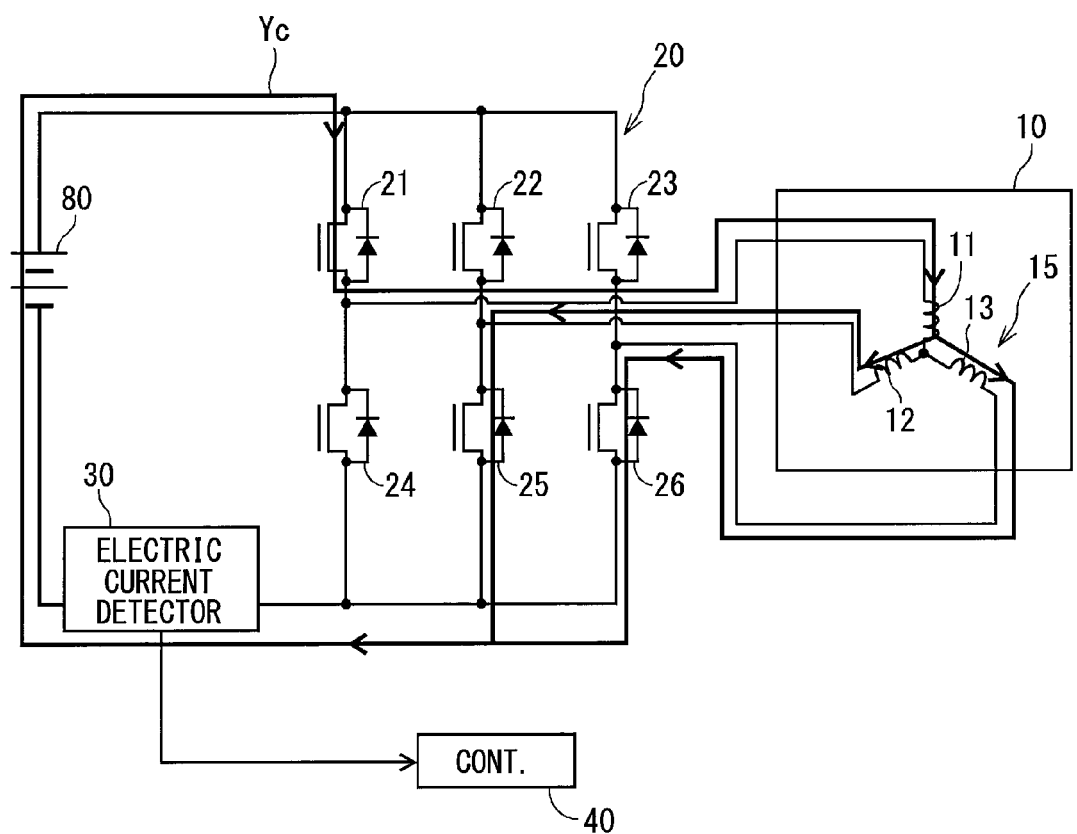
FIG. 5 is a schematic diagram of the rotating electric machine driver and a flow of a normal electric current flowing therein at a normal operation time in one embodiment of the present disclosure.

Here, the detection operation of the electric current in the present embodiment is described based on FIGS. 3-5.

FIG. 3 shows the relationship between a combination of switching on-off of the SW 21-26, and the bus line current supplied to the shunt resistor 30. In FIG. 3, "H" represents an ON state of the upper arm elements 21-23 and an OFF state of the lower arm elements 24-26 in the U, V, W phases, and "L" represents an OFF state of the upper arm elements 21-23 and an OFF state of the lower arm elements 24-26 in those phases. Further, an electric current flowing from the inverter 20 to the winding wire 15 is represented by a "+" sign, and an electric current flowing from the winding wire 15 to the inverter 20 is represented by a "−" (i.e., minus) sign. Further, in FIG. 4, a maximum phase having the largest duty instruction value is the U phase, a middle phase having a middle duty instruction value is the V phase, and a minimum phase having the smallest duty instruction value is the W phase. Further, the instruction signals UL, VL, WL concerning the lower arm elements 24-26 are omitted.

As shown in FIG. 3, there are eight kinds of voltage vector patterns according to the combination of switching on-off of the SW 21-26. Among them, a V0 voltage vector whose lower arm elements 24-26 are ON altogether, and a V7 voltage vector whose upper arm elements 21-23 are ON altogether are respectively zero voltage vectors. When the voltage vector is a zero voltage vector, the bus line current which flows in the shunt resistor 30 is a zero voltage vector, thereby no electric current is detected.

A V1 voltage vector to a V6 voltage vector which respectively have at least one of the upper arm elements 21-23 switched ON and at least one of the lower arm elements 24-26 switched ON are active voltage vectors. When the voltage vector is an active voltage vector, the bus line current flowing in the shunt resistor 30 is equal to the electric current in a phase whose switched-on arm is different from the arms in other two phases.

More practically, as for a period from time T2 to time T3 in FIG. 4, the U phase has the upper arm element 21 switched ON and the V and W phases have the lower arm elements 25, 26 switched ON, which creates the V4 voltage vector. During such period, the electric current flows along a path that is shown in FIG. 5 as an arrow Yc, the electric current flowing in the shunt resistor 30 is equal to the electric current (+Iu) which flows from the inverter 20 to the U phase coil 11.

Returning to FIG. 4, as for a period from time T5 to time T6, the upper arm elements 21 and 22 in the U and V phases are switched ON and the W the lower arm element 26 in the W phase is switched ON, which creates the V6 voltage vector. During such period, the electric current flowing in the shunt resistor 30 is equal to the electric current (−Iw) which flows from the W phase coil 13 to the inverter 20.

In the present embodiment, since the electric current is detected by using only one shunt resistor 30, the electric current is detected in two active voltage vector periods which can detect the electric current in different phases. According to the present embodiment, in one cycle of the carrier signal C, the current detection is performed twice. In an example shown in FIG. 4, the detected electric current value Ic detected in a V4 voltage-vector period from time T2 to time T3 is considered as an electric current +Iu, and the detected electric current value Ic detected in a V6 voltage-vector period from time T5 to time T6 is considered as an electric current −Iw. Then, in the electric current calculator 41, each of the three phase currents Iu, Iv, Iw (i.e., a remaining one phase current, which is the V phase current Iv in FIG. 4) is calculated based on a sum of three-phase currents=0 and the two other phase currents.

In the above, since a "ringing" which means a turbulence of the electric current flowing in the shunt resistor 30 is caused when the on-off state of the SW 21-26 changes, the electric current detection is required after such ringing is converged. Therefore, the electric current detection is performed within an active voltage vector period, and is performed at a ringing converged timing which is a timing measured from a start of the active voltage vector period at least after a lapse of a "ringing convergence time" that is required for the convergence of the ringing. For example, when the electric current detection is performed at a midpoint timing of an active voltage vector period, the active voltage period has to at least have a double length of the "ringing convergence time." According to the present embodiment, the ringing convergence time is equal to a "minimum retention time that is a time period between (i) a start of a voltage vector period for a detection of an electric current by the electric current detector and (ii) an electric current detection timing."

Here, a case in which an open failure which disables conduction of the lower arm element 26 in the W phase is caused is described.

When the lower arm element 26 is normal, a period from time T2 to time T3 is the V4 voltage vector, as indicated by an arrow Yc in FIG. 5, and the electric current flows from the inverter 20 to the U phase coil 11, and the electric current also flows from the V phase coil 12 and the W phase coil 13 to the inverter 20. During such period, the electric current flowing in the shunt resistor 30 is equal to the electric current (+Iu) which flows from the inverter 20 to the U phase coil 11 as described above.

Figure 6:
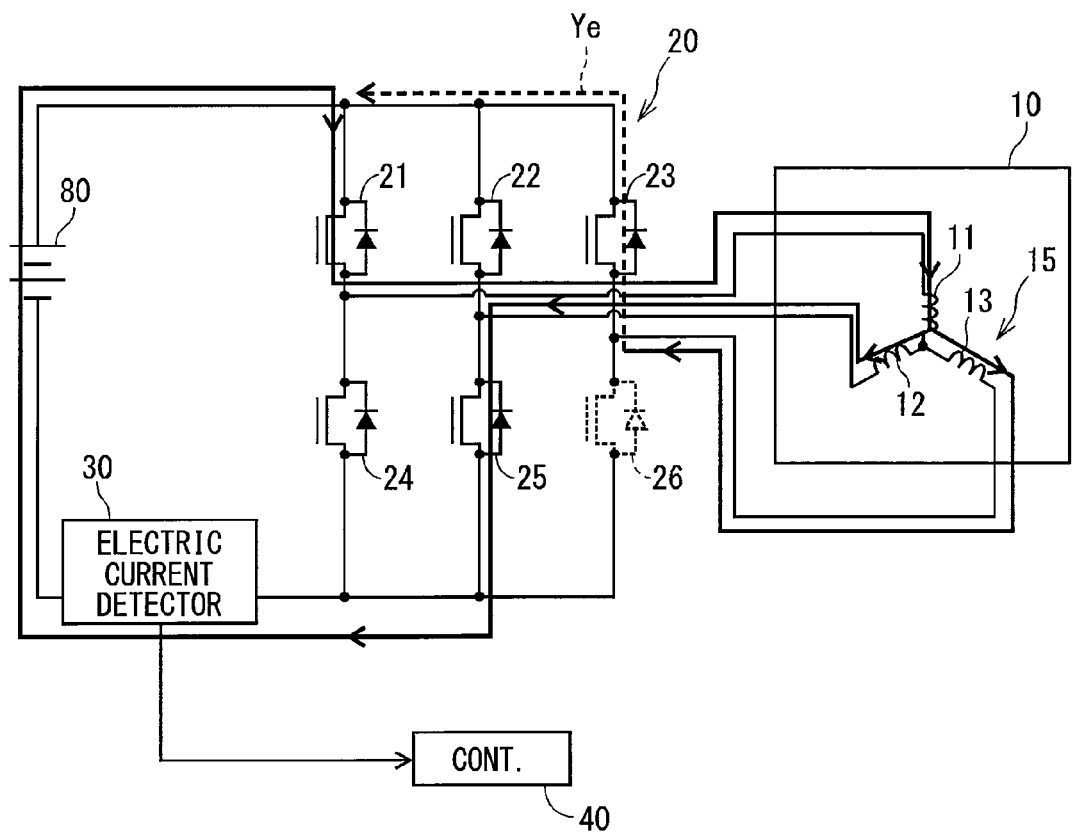
FIG. 6 is a schematic diagram of the rotating electric machine driver and a flow of an electric current flowing therein at an open failure time in one embodiment of the present disclosure.

When an open failure is caused in the lower arm element 26, although the electric current supplied to the motor 10 will not change, a flow (Yc) of the electric current flowing from the W phase coil 13 to the inverter 20 during the period from time T2 to time T3 is changed to another flow as shown in FIG. 6 by an arrow Ye, which flows through a diode of the upper arm element 23 in the W phase to the upper arm element 21 in the U phase which is switched on. During such period, the electric current flowing in the shunt resistor 30 is equal to the current (−Iv) which flows from the V phase coil 12 to the inverter 20.

Since the controller 40 internally considers that the period from time T2 to time T3 is the V4 voltage vector period when an open failure is caused in the lower arm element 26, the detected current value Ic is, even though it actually is equal to the electric current (−Iv) which flows from the V phase coil 12 to the inverter 20, misdetected as being equal to the electric current (+Iu) which flows from the inverter 20 to the U phase coil 11.

That is, the controller 40 possibly misdetects the flow direction and the phase of the bus line electric current that corresponds to the detected current value Ic, when an open failure is caused in the SW 21-26. Therefore, when an open failure is caused in the SW 21-26, a drive of the motor 10 based on each of the phase currents Iu, Iv, Iw that are derived from a misdetected flow direction and phase of the detected electric current value Ic, such a drive of the motor 10 may lead to an unintended behavior of the motor 10 such as a reverse rotation or the like.

Figure 7:
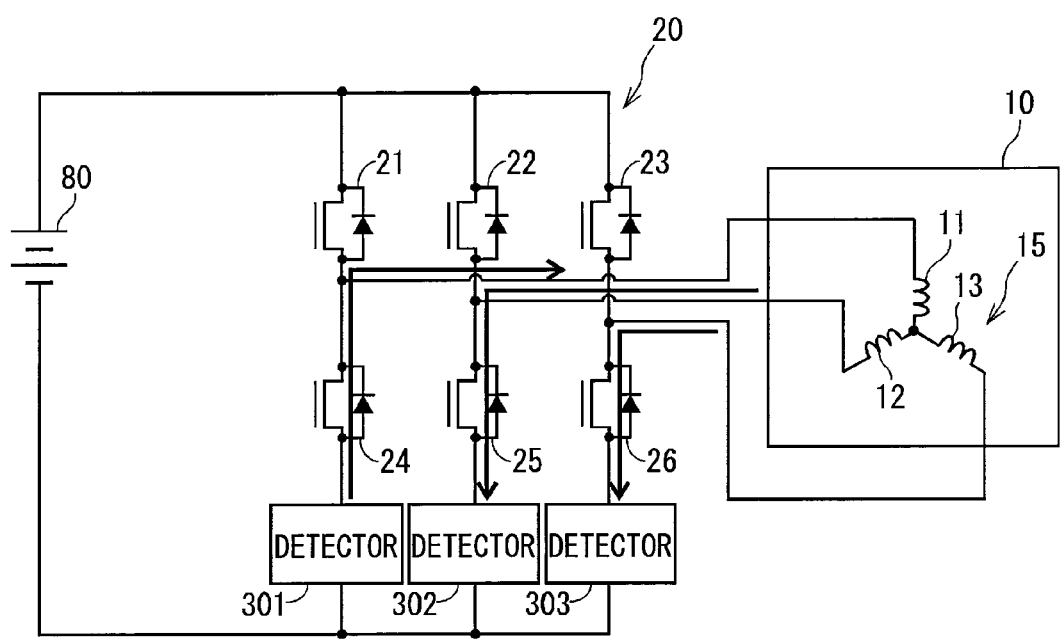
FIG. 7 is a schematic diagram of the rotating electric machine driver and a flow of an electric current flowing therein at a switching element normal time when a shunt resister is disposed in each of multiple phases in one embodiment of the present disclosure.
Figure 8:
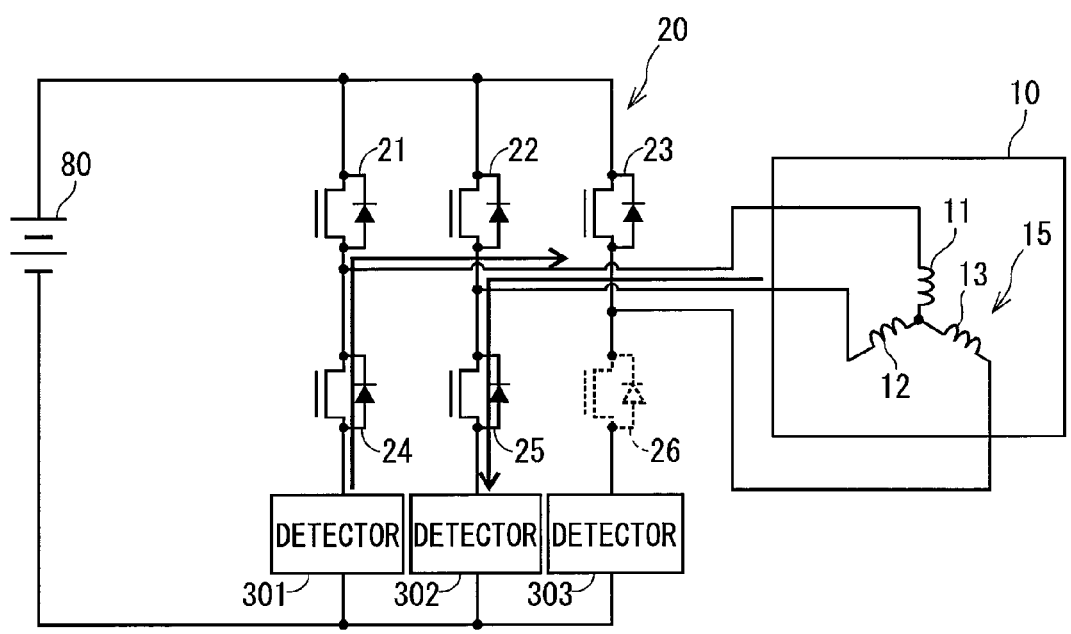
FIG. 8 is a schematic diagram of the rotating electric machine driver and a flow of an electric current flowing therein at the open failure time when the shunt resister is disposed in each of multiple phases in one embodiment of the present disclosure.

Further, as shown in FIG. 7, when electric current detectors 301, 302, 303 which are shunt resistors are disposed in each of those phases, each of the phase currents Iu, Iv, Iw is detected during the V0 voltage vector period in which all of the lower arm elements 24-26 are switched ON. When all of the SW 21-26 are normal, the electric current according to the latest switch state is detected by the shunt resistors 301-303. Further, as shown in FIG. 8, when the lower arm element 26 has an open failure, even though the detected current value detected by the shunt resistor 303 stays at zero, the U phase current Iu detected by the shunt resistor 301 and the V phase current Iv detected by the shunt resistor 302 are normally/correctly detectable, which are not prone to misdetection, in terms of the flow direction and the phase of the detected electric current.

In FIGS. 5-8, in order to provide ease of reading, components such as the position sensor 16, the custom IC 50 etc. as well as other control lines are omitted from the drawing.

The "open failure" in a context of the present embodiment means that each of the SW 21-26 is not "conductive," which not only includes a breakage of each of the SW 21-26 itself but also includes abnormalities of the instruction signals UH, UL, VH, VL, WH, WL outputted from the controller 40 and abnormalities of the amplified signals UHG, ULG, VHG, VLG, WHG, WLG outputted from the signal amplifier 51.

In the present embodiment, for the avoidance of the misdetection of each of the phase currents Iu, Iv, Iw, the abnormality detector 55 monitors the abnormalities of the instruction signals UH, UL, VH, VL, WH, WL.

Figure 9:
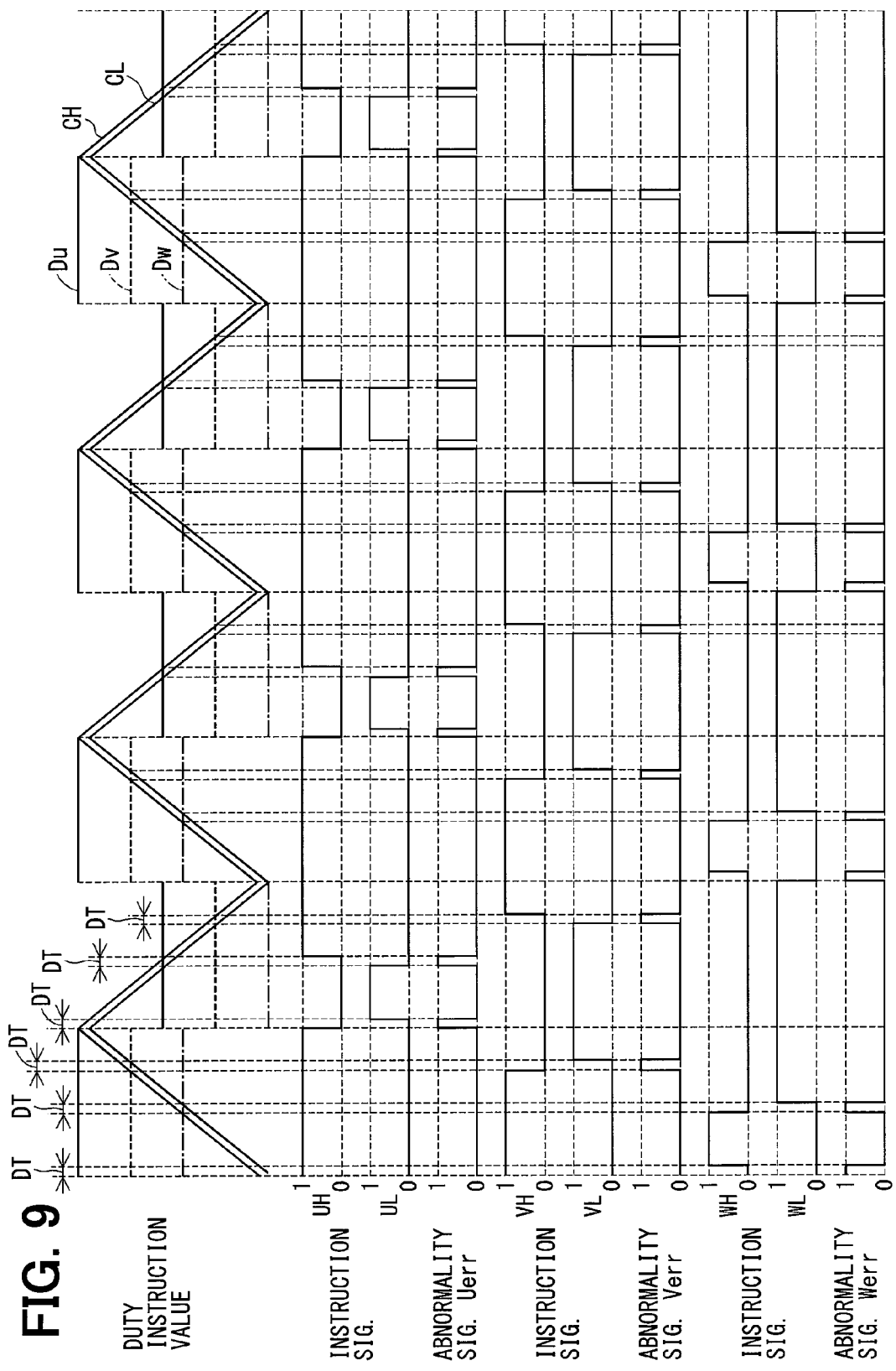
FIG. 9 is a time diagram of an abnormality signal at a normal operation time in one embodiment of the present disclosure.

FIG. 9 shows an example, in which the instruction signals UH, UL, VH, VL, WH, WL based on the duty instruction values Du, Dv, Dw and the carrier signal C are normal. In FIG. 9, a solid line represents the duty instruction value Du, a broken line represents the duty instruction value Dv, and a dot-dash line represents the duty instruction value Dw. Further, a dead time DT is shown only for one cycle of the carrier signal C, and omitted from the other cycles. The same convention applies to FIG. 10.

According to the present embodiment, in one cycle of the carrier signal C (refer to FIG. 4), a former period is a portion from a valley to a peak and a latter period is a portion from the peak to the valley. In the former period, a neutral point voltage is changed so that the duty of the largest phase among the duty instruction values Du, Dv, Dw serves as a predetermined upper limit. In the latter period, the neutral point voltage is changed so that the duty of the smallest phase among the duty instruction values Du, Dv, Dw serves as a predetermined lower limit. In such case, even when the neutral point voltage is changed, the line voltage does not change.

The carrier signal C comprises an upper carrier signal CH concerning a control of the upper arm elements 21-23 and a lower carrier signal CL concerning a control of the lower arm elements 24-26. In the present embodiment, a short circuit by a simultaneous switching ON of both of the upper arm element and the lower arm element in the same phase is prevented, by devising a shift between the upper carrier signal CH and the lower carrier signal CL, which creates the dead time during which a switching OFF of both of a pair made up of the upper and lower elements in the same phase is realized, i.e., for three pairs of the elements 21 and 24, 22 and 25, and 23 and 26.

Moreover, at the peak of the carrier signal C, for a prevention of a simultaneous switch ON of the upper arm element 21 and the lower arm element 24 in the maximum phase (i.e., in the U phase in FIG. 9), the switch ON timing of the lower arm element 24 is delayed by an amount of the dead time. Similarly, at the bottom of the valley of the carrier signal C, for a prevention of a simultaneous switch ON of the upper arm element 23 and the lower arm element 26 in the minimum phase (i.e., in the W phase in FIG. 9), the switch ON timing of the upper arm element 23 is delayed by an amount of the dead time DT.

With reference to FIG. 9, the U phase is taken as an example of detecting the abnormalities of the instruction signals UH, UL, VH, VL, WH, WL.

When the duty instruction value Du is greater than the upper carrier signal CH, the instruction signal UH serves as an ON instruction, and when the duty instruction value Du is smaller than upper the carrier signal CH, the instruction signal UH serves as an OFF instruction.

Further, when the duty instruction value Du is smaller than the lower carrier signal CL, the instruction signal UL serves as an ON instruction, and, when the duty instruction value Du is greater than the lower carrier signal CL, the instruction signal UL serves as an ON instruction.

Thereby, except for the dead time DT, one of the instruction signals UH and UL serves as an ON instruction, and the other of the two signals serves as an OFF instruction. Further, as for both the dead time DT, both of the instruction signals UH and UL serve as an OFF instruction.

The abnormality detector 55 detects a simul-ON state of the instruction signals UH, UL and a simul-OFF state of the same signals.

When one of the instruction signals UH, UL is an ON instruction and the other of the two is an OFF instruction, the instruction signals UH and UL are normal, and an abnormality signal Uerr is put in a low level (i.e., shown as "0").

Further, when both of the instruction signals UH and UL are ON instructions simultaneously or when both are OFF instructions simultaneously, the abnormality signal Uerr is put in a high level (i.e., shown as "1"). When the abnormality signal Uerr is in a high level, the count of the abnormality counter is started.

The same applies to the V phase. That is, when one of the instruction signals VH, VL is an ON instruction and the other of the two is an OFF instruction, an abnormality signal Verr is put in a low level (i.e., shown as "0"). When both of the instruction signals VH, VL are ON instructions or OFF instructions, the abnormality signal Verr is put in a high level (i.e., shown as "1"), and the count of the abnormality counter is started.

Further, the same applies to the W phase. That is, when one of the instruction signals WH, WL is an ON instruction and the other of the two is an OFF instruction, an abnormality signal Werr is put in a low level (i.e., shown as "0"). When both of the instruction signals WH, WL are ON instructions or OFF instructions, the abnormality signal Werr is put in a high level (i.e., shown as "1"), and the count of the abnormality counter is started.

According to the present embodiment, since the dead time is provided, even when the instruction signals UH, UL, VH, VL, WH, WL are normal, during the dead time DT, the abnormality signals Uerr, Verr, Werr are temporarily put in a high level, and the count of the abnormality counter is started. After an end of the dead time DT, the abnormality signals Uerr, Verr, Werr return to a low level, and the abnormality counter will be reset.

Figure 10:
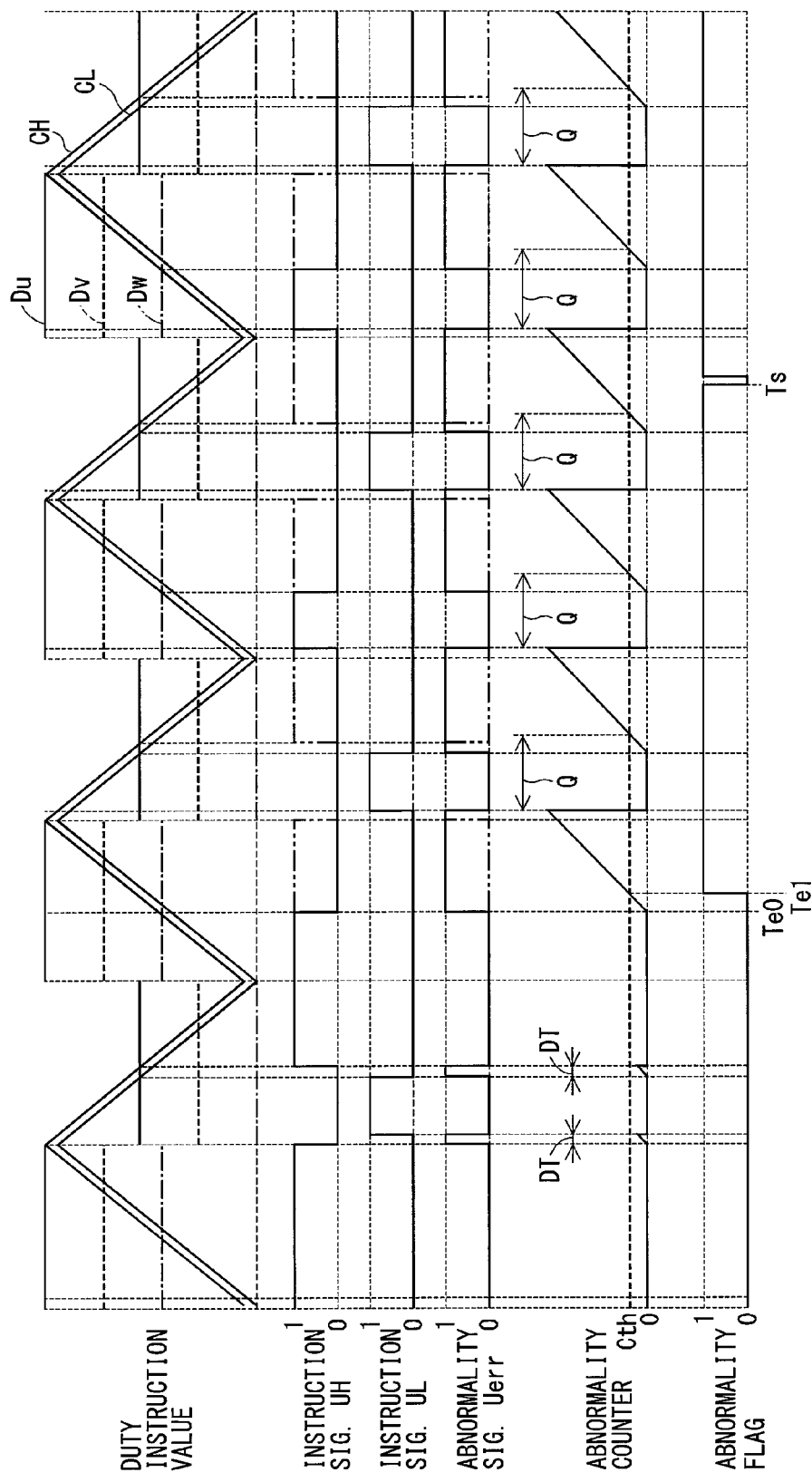
FIG. 10 is a time diagram of the abnormality signal at an open failure time in one embodiment of the present disclosure.

The abnormality situation in which the instruction signals UH, UL, VH, VL, WH, WL has the abnormality is described based on FIG. 10. Since the abnormality determination in the V and W phases is the same as the U phase, the U phase abnormality determination is taken as an example. The duty instruction values Du, Dv, Dw of FIG. 10 and the carrier signals CH, CL are the same as those of FIG. 9.

FIG. 10 is an example of having abnormality in the instruction signal UH. If the instruction signal UH is normal, the instruction signal UH is generated based on a duty instruction value Du. However, in this case of abnormality situation, the instruction signal UH is generated at time Te0 not based on the duty instruction value Du but based on the duty instruction value Dw. In FIG. 10, a two-dot chain line represents the instruction signal UH at the normal time.

At time Te0, the instruction signal UH changes from an ON instruction to an OFF instruction. Further, as for the instruction signal UL, an OFF instruction is continued. Since the instruction signals UH and UL serve as an OFF instruction simultaneously at this time, the abnormality signal Uerr is put in a high level. When the abnormality signal Uerr is put in a high level, the count of the abnormality counter is started.

When the counted value of the abnormality counter exceeds an abnormality determination threshold value Cth at time Te1, a U phase abnormality flag FlgU is set. In the following, a set state of the U phase abnormality flag FlgU is designated as "1," and a not-set state of the FlagU is designated as "0."

Here, an abnormality determination threshold value Cth is described.

According to the present embodiment, when an abnormal state, i.e., a simul-ON state or a simul-OFF state in which both of the instruction signals UH, UL are an ON instruction or an OFF instruction simultaneously, is detected, the abnormality signal Uerr is put in a high level and the count of the abnormality counter is started. Further, in the present embodiment, since the dead time is provided, the instruction signals UH and UL serve as an OFF instruction simultaneously during the dead time DT. Therefore, even when the instruction signals UH and UL are normal, the abnormality signal Uerr is put in a high level during the dead time DT, and the count of the abnormality counter is started.

Thus, according to the present embodiment, the abnormality determination threshold value Cth is set as a greater value than a value corresponding to the dead time DT in order to prevent a misdetection that detects the dead time as the abnormalities. In such manner, a misdetection of a simul-OFF state in which both of the instruction signals UH, UL are an OFF instruction simultaneously during the dead time as the abnormalities is prevented.

According to the present embodiment, the electric current detection is performed after a lapse of the ringing convergence time from the start of the active voltage vector period. In other words, after switching of the on-off state of the SW 21-26, the electric current detection will not be performed for the ringing convergence time. Therefore, the abnormality determination threshold value Cth is set to have a value that is equal to or smaller than the ringing convergence time.

Thereby, a misdetection of the phase and the flow direction of the detected current value Ic due to the abnormalities of the instruction signals UH, UL is prevented.

According to the present embodiment, a time represented by the abnormality determination threshold value Cth corresponds to a "simul-OFF abnormality determination time" and a "simul-ON abnormality determination time" in the claims.

According to the present embodiment, information about the U phase abnormality flag FlgU is transmitted to the controller 40 at time Ts when a communication request from the controller 40 is received. Therefore, when the U phase abnormality flag FlgU is set, during a time period between (i) time Te1 when the abnormality flag FlgU is set and (ii) time Ts when the information about the U phase abnormality flag FlgU is transmitted, a flag set state in which the U phase abnormality flag FlgU is set is maintained.

That is, even when the instruction signal UH is abnormal, one of the instruction signals UH and UL may serve as an ON instruction and the other of the two signals may serve as an OFF instruction, thereby temporarily putting the abnormality signal Uerr in a low level in some cases. In such cases, although the abnormality counter is once reset, the flag set state in which the U phase abnormality flag FlgU is set is maintained for a time period Q between (i) a reset timing of the abnormality counter and (ii) a timing when a count value of the abnormality counter exceeds the abnormality determination threshold value Cth again.

When the communication request from the controller 40 is received and the information concerning an abnormality flag is transmitted to the controller 40, the U phase abnormality flag FlgU is reset.

In FIG. 10, for clearly indicating the resetting of the U phase abnormality flag FlgU, a reset period is described as a relatively long period, which is a period of time longer than a monitor cycle by the monitor section 43 included in the controller 40. However, since the abnormality counter will not actually be reset after transmission of the U phase abnormality flag FlgU to the controller 40, the reset of the U phase abnormality flag FlgU is performed promptly.

Figure 11:
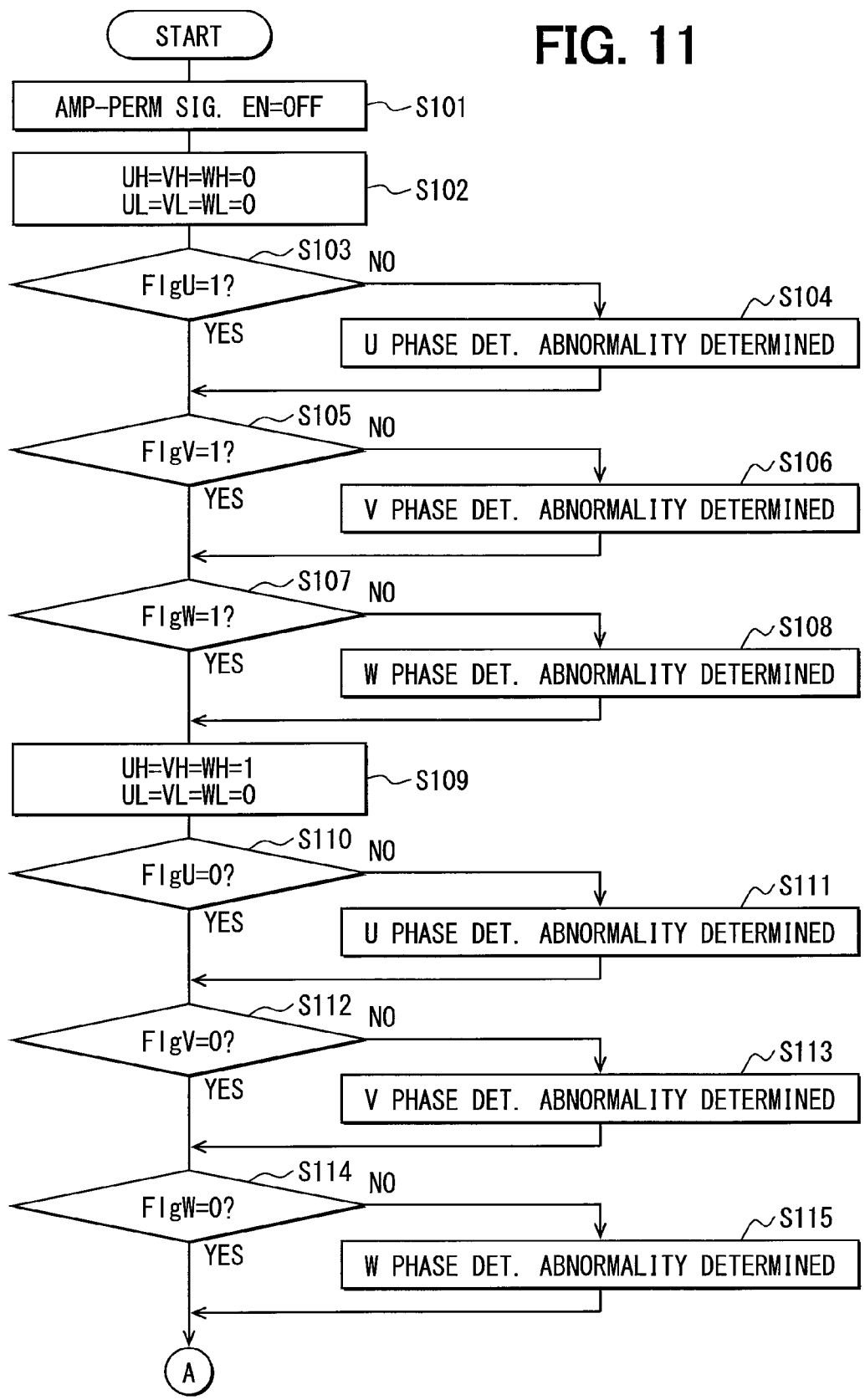
FIG. 11 is a flowchart of an initial check process in one embodiment of the present disclosure.
Figure 12:
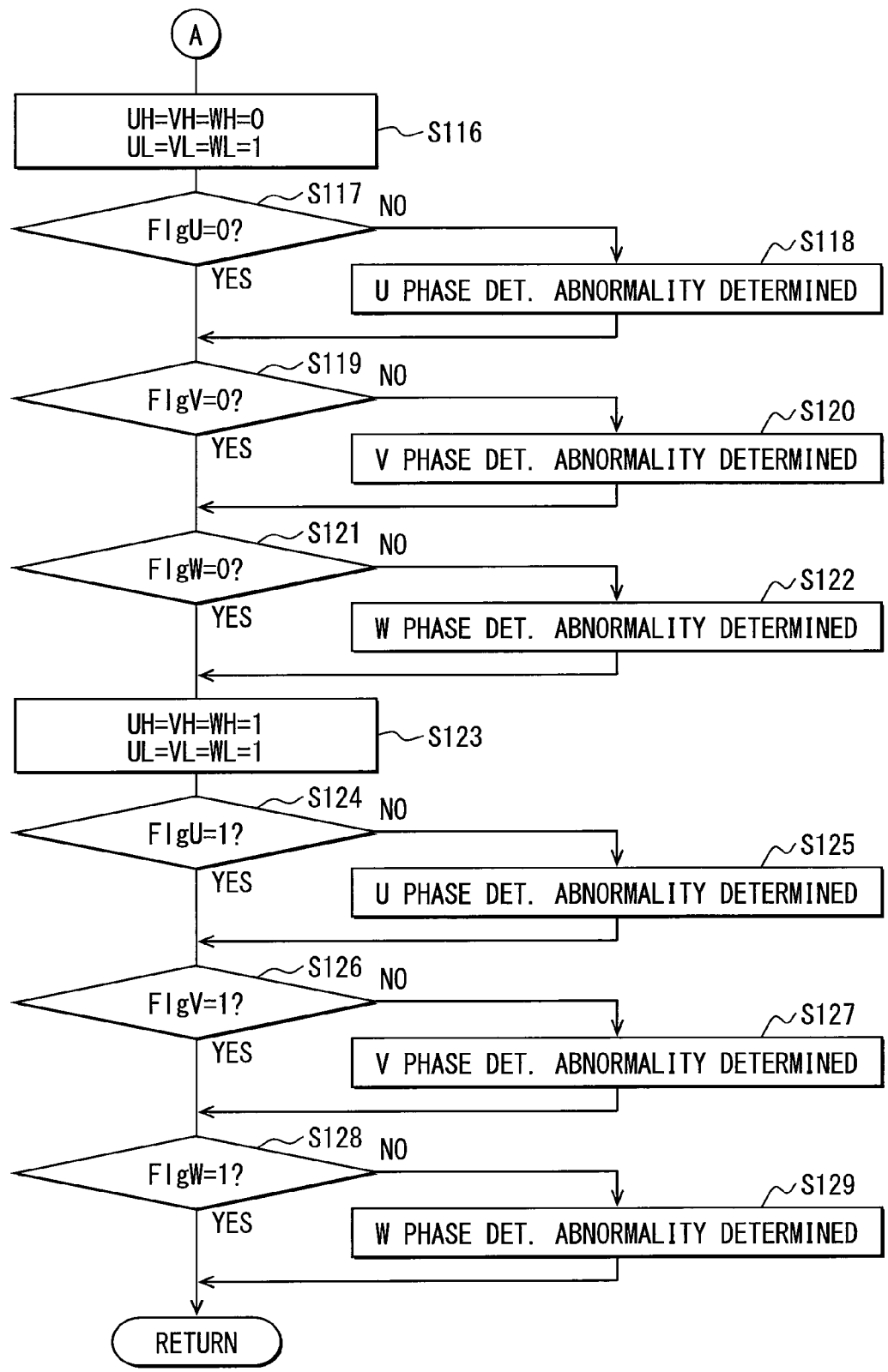
FIG. 12 is a continuation of a flowchart of the initial check process in one embodiment of the present disclosure.
Figure 13:
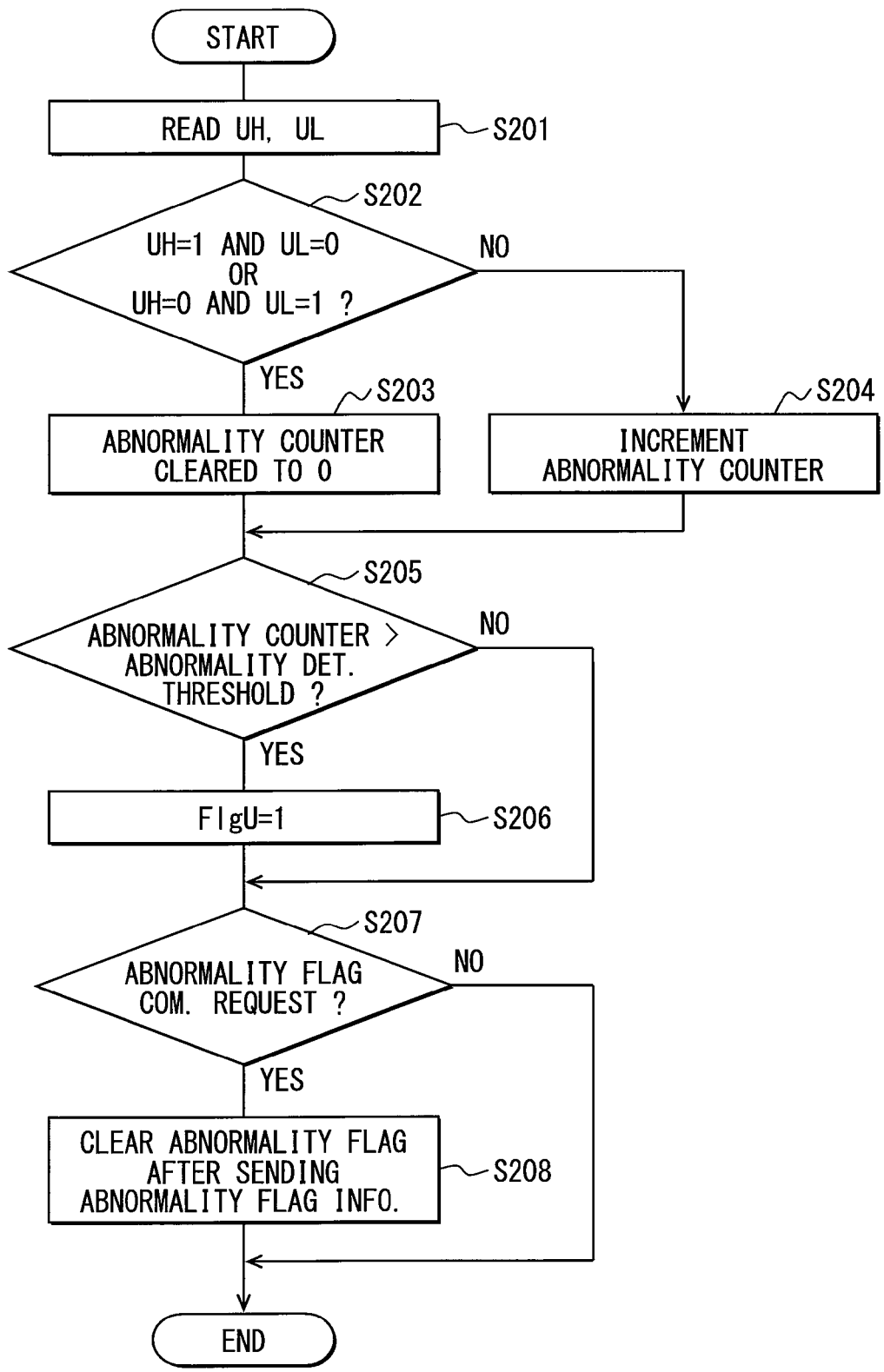
FIG. 13 is a flowchart of an abnormality determination process in one embodiment of the present disclosure.

The abnormality determination process of the present embodiment is described based on FIGS. 11-13.

FIGS. 11 and 12 are flowcharts concerning an initial check process performed at the monitor section 43, which is performed before the abnormality determination process shown in FIG. 13 is performed.

As shown in FIG. 11, in Step S101 (hereafter, a "step" is omitted and only a sign "S" is added), the amplification permission signal EN transmitted from the controller 40 to the signal amplifier 51 is switched OFF. In this manner, even when the instruction signals UH, UL, VH, VL, WH, WL are outputted from the controller 40 during the initial check process, the amplified signals UHG, ULG, VHG, VLG, WHG, WLG are not generated by the signal amplifier 51, and the amplified signal UHG, ULG, VHG, VLG, WHG, WLG are not outputted to the inverter 20, thereby a shutdown state of the inverter 20 is continued and the motor 10 is not driven.

In S102, all of the instruction signals UH, UL, VH, VL, WH, WL are switched to an OFF instruction.

In S103, it is determined whether the U phase abnormality flag FlgU is equal to 1, which indicates that both of the instruction signals UH and UL are ON instructions or OFF instructions simultaneously. When it is determined that the U phase abnormality flag FlgU=1 (S103:YES), a normal determination is established and the process shifts to S105.

When it is determined that the U phase abnormality flag FlgU=0 (S103:NO), the process shifts to S104.

In S104, it is determined whether the U phase detector in the abnormality detector 55 has the abnormalities.

In S105, it is determined whether it is the V phase abnormality flag FlgV is equal to 1, which indicates that both of the instruction signals VH and VL are ON instructions or OFF instructions simultaneously. When it is determined that V phase abnormality flag FlgV=1 (S105:YES), a normal determination is established and the process shifts to S107.

When it is determined that the V phase abnormality flag FlgV=0 (S105:NO), the process shifts to S106.

In S106, it is determined whether the V phase detector in the abnormality detector 55 has the abnormalities.

In S107, it is determined whether the W phase abnormality flag FlgW is equal to 1, which indicates that both of the instruction signals WH and WL are ON instructions or OFF instructions simultaneously. When it is determined that the W phase abnormality flag FlgW=1 (S107:YES), a normal determination is established, and the process shifts to S109.

When it is determined that the W phase abnormality flag FlgW=0 (S107:NO), the process shifts to S108.

In S108, it is determined whether the W phase detector in the abnormality detector 55 has the abnormalities.

In S109, the high-side instruction signals UH, VH, WH concerning the drive of the upper arm elements 21-23 are respectively switched to an ON instruction, and the low-side instruction signals UL, VL, WL concerning the drive of the lower arm elements 24-26 are respectively switched to an OFF instruction.

In S110, it is determined whether the U phase abnormality flag FlgU is equal to 0. When it is determined that the U phase abnormality flag FlgU=0 (S110:YES), a normal determination is established, and the process shifts to S112.

When it is determined that the U phase abnormality flag FlgU=1 (S110:NO), the process shifts to S111.

In S111, it is determined whether the U phase detector in the abnormality detector 55 has the abnormalities.

In S112, it is determined whether the V phase abnormality flag FlgV=0. When it is determined that the V phase abnormality flag FlgV=0 (S112:YES), a normal determination is established, and the process shifts to S114.

When it is determined that the V phase abnormality flag FlgV=1 (S112:NO), the process shifts to S113.

In S113, it is determined whether the V phase detector in the abnormality detector 55 has the abnormalities.

In S114, it is determined whether the W phase abnormality flag FlgW=0. When it is determined that the W phase abnormality flag FlgW=0 (S114:YES), a normal determination is established, and the process shifts to S116.

When it is determined that the W phase abnormality flag FlgW=1 (S114:NO), the process shifts to S115.

In S115, it is determined whether the W phase detector in the abnormality detector 55 has the abnormalities.

In S116 of FIG. 12, the high-side instruction signal UH, VH, WH concerning the drive of the upper arm elements 21-23 are respectively switched to an OFF instruction, and the low-side instruction signals UL, VL, WL concerning the drive of the lower arm elements 24-26 are respectively switched to an ON instruction.

The process in each of S117-S122 is the same as the process in each of S110-S115 in FIG. 11.

In S123, all of the instruction signals UH, UL, VH, VL, WH, WL are switched to an ON instruction.

The process in each of S124-S129 is the same as the process in each of S103-S108 in FIG. 11.

The initial check process confirms/determines, in S102-S108, that high-low simultaneous OFF instructions lead to the abnormality determination.

In S109-S115, the process confirms that a combination of (i) the high-side instruction signals UH, VH, WH switched to an ON instruction and (ii) the low-side instruction signals UL, VL, WL switched to an OFF instruction leads to the normal determination.

In S116-S122, the process confirms that a combination of (i) the high-side instruction signal UH, VH, WH switched to an OFF instruction and (ii) the low-side instruction signals UL, VL, WL switched to an ON instruction leads to the normal determination.

In S123-S129, the process confirms that high-low simultaneous ON instructions lead to the abnormality determination. For example, when a reservable time for an initial check is short, some of S102-S108, S109-S115, S116-S122, S123-S129 may be omitted. Further, when the abnormalities of one of the U phase detector, the V phase detector, or the W phase detector are determined, in the later steps, the process for the abnormality-determined phase may be omitted.

In such manner, it is confirmed that an abnormality detection function in the abnormality detector 55 is normal (i.e., working properly or correctly detected). What is meant by "an abnormality detection function in the abnormality detector 55 is correctly detected" in this context is that there are no abnormalities, e.g., a break/disconnection and a short circuit to a high/low-side along a path between the terminals P1-P6 and the abnormality detector 55.

The abnormality determination process performed after the initial check process is described based on FIG. 13. The abnormality determination process shown in FIG. 13 is performed after the initial check process by the abnormality detector 55 at a predetermined interval during a switch-ON time when the rotating electric machine driver 1 is switched on. Here, the U phase detector performing the abnormality determination process for determining abnormalities of the U phase is described as a representative example, which is applicable to the other two phases, i.e., to the V phase detector for the V phase and to the W phase detector for the W phase.

In S201, the process reads the instruction signals UH and UL.

In S202, it is determined whether one of the instruction signals UH and UL is an ON instruction or not, and the other one of the two signals is an OFF instruction. That is, when (i) UH=1 and UL=0 or (ii) UH=0 and UL=1, the process is affirmatively determined, and when UH=UL=1 or UH=UL=0, the process is negatively determined.

When it is determined that one of the instruction signals UH and UL is an ON instruction and the other one of the two signals is an OFF instruction (S202:YES), the process shifts to S203. When it is determined that both instruction signals UH and UL are an ON instruction, or, when it is determined that both are instruction signals are an OFF instruction (S202:NO), the process shifts to S204.

In S203, the abnormality counter is cleared to zero.

In S204, the abnormality counter is incremented.

In S205, it is determined whether the counted value of the abnormality counter is greater than the abnormality determination threshold value Cth.

When it is determined that the counted value of the abnormality counter is smaller than the abnormality determination threshold value Cth (S205:NO), the process shifts to S207.

When it is determined that the counted value of the abnormality counter is greater than the abnormality determination threshold value Cth (S205:YES), the process shifts to S206.

In S206, the U phase abnormality flag FlgU is set.

In S207, it is determined whether a flag communication request from the controller 40 has arrived. When it is determined that there is no flag communication request (S207:NO), the process in S208 is skipped. When it is determined that the flag communication request exist (S207:YES), the process shifts to S208.

In S208, the information about the U phase abnormality flag FlgU is transmitted to the controller 40, and the U phase abnormality flag FlgU is reset after such transmission.

The process of FIGS. 11-13 may be implemented as software process, or may be implemented as hardware process. For example, when the process of FIG. 13 is implemented as hardware process, S202 corresponds to a HI/LO determination circuit, S203 and S204 correspond to a counter circuit, and S205 corresponds to a comparison circuit, which in summary realizes a relatively simple circuit configuration for the detection of the simul-ON/simul-OFF instruction abnormality of the instruction signals UH, UL.

As described in full details above, the rotating electric machine driver 1 in the present embodiment is provided with the inverter 20, the shunt resistor 30, the controller 40, and the abnormality detector 55.

The inverter 20 has the upper arm elements 21-23 provided on the high potential side and the lower arm elements 24-26 provided on the low potential side of upper arm elements 21-23, which respectively correspond to each phase of the winding wire 15 of the motor 10.

The shunt resistor 30 detects the electric current supplied to the winding wire 15.

The controller 40 obtains the detected current value Ic detected by the shunt resistor 30, and generates, based on the detected current value Ic, the high-side instruction signals UH, VH, WH which are respectively an instruction signal for switching on-off of the upper arm elements 21-23 and the low-side instruction signals UL, VL, WL which are respectively an instruction signal for switching on-off of the lower arm elements 24-26.

When the simultaneous OFF state in which both of the high-side instruction signal UH and the low-side instruction signal UL for a pair made up of the upper arm element 21 and the lower arm element 24 serve as an OFF instruction continues at least for the simultaneous OFF abnormality determination time (S205:YES in FIG. 13), the abnormality detector 55 determines the simul-OFF abnormality of a pair made up of the high-side instruction signal UH and the low-side instruction signal UL (S206).

Further, when the simultaneous OFF state in which both of the high-side instruction signal VH and the low-side instruction signal VL for a pair made up of the upper arm element 22 and the lower arm element 25 serve as an OFF instruction continues at least for the simultaneous OFF abnormality determination time, the abnormality detector 55 determines the simul-OFF abnormality of a pair made up of the high-side instruction signal VH and the low-side instruction signal VL.

Furthermore, when the simultaneous OFF state in which both of the high-side instruction signal WH and the low-side instruction signal WL for a pair made up of the upper arm element 23 and the lower arm element 26 serve as an OFF instruction continues at least for the simultaneous OFF abnormality determination time, the abnormality detector 55 determines the simul-OFF abnormality of a pair made up of the high-side instruction signal WH and the low-side instruction signal WL.

Thereby, the simul-OFF abnormalities of a pair made up of the high-side instruction signal UH and the low-side instruction signal UL, of a pair made up of the high-side instruction signal VH and the low-side instruction signal VL, and/or of a pair made up of the high-side instruction signal WH and the low-side instruction signal WL are appropriately detectable.

According to the present embodiment, the shunt resistor 30 is disposed at a position between the inverter 20 and the negative side of the battery 80, and detects the bus line current. The controller 40 then calculates each of the phase currents Iu, Iv, Iw according to the on-off state of the SW 21-26 based on the bus line current detected by the shunt resistor 30.

Therefore, when an open failure which disables switch-ON of the SW 21-26 at a switch-ON timing is caused due to the abnormalities of the instruction signals UH, UL, VH, VL, WH, WL, the flow direction and the phase of the electric current corresponding to the detected current value Ic detected by the shunt resistor 30 may possibly be misdetected.

Thus, in the present embodiment, the abnormality detector 55 detects an open failure that is caused by a simul-OFF abnormality of a pair made up of the high-side instruction signal UH and the low-side instruction signal UL, of a pair made up of the high-side instruction signal VH and the low-side instruction signal VL, and/or of a pair made up of the high-side instruction signal WH and the low-side instruction signal WL. In such manner, since the misdetection of each of the phase currents Iu, Iv, Iw is prevented, an unintended behavior of the motor 10 is prevented.

The simultaneous OFF abnormality determination time is longer than the dead time DT during which the upper arm elements 21-23 and the lower arm elements 24-26 are simultaneously switched OFF in order to prevent the simultaneous ON of those elements 21-26, and is equal to or shorter than the minimum retention time that is a time period between (i) a start of the voltage vector period for a detection of an electric current by the shunt resistor 30 and (ii) an actual electric current detection timing.

By devising such a simultaneous OFF abnormality determination time, a misdetection of determining the dead time DT as abnormal is prevented. Further, since the detected current value Ic is detected after the completion of the ringing of the electric current supplied to the shunt resistor 30, the ringing convergence time that is set according to a required time for the convergence of the ringing may be used as the minimum retention time, for example. When the simultaneous OFF abnormality determination time is set to be equal to or shorter than the minimum retention time, the detection of the detected current value Ic will not be performed in a period between a start of the simultaneous OFF abnormality and a determination timing of such abnormality, thereby securely preventing the misdetection of each of the phase currents Iu, Iv, Iw.

When the simultaneous ON state in which both of the high-side instruction signal UH and the low-side instruction signal UL for a pair made up of the upper arm element 21 and the lower arm element 24 serve as an ON instruction continues at least for the simultaneous ON abnormality determination time (S205:YES in FIG. 13), the abnormality detector 55 determines the simul-ON abnormality of a pair made up of the high-side instruction signal UH and the low-side instruction signal UL (S206).

Further, when the simultaneous ON state in which both of the high-side instruction signal VH and the low-side instruction signal VL for a pair made up of the upper arm element 22 and the lower arm element 25 serve as an ON instruction continues at least for the simultaneous ON abnormality determination time, the abnormality detector 55 determines the simul-ON abnormality of a pair made up of the high-side instruction signal VH and the low-side instruction signal VL.

Furthermore, when the simultaneous ON state in which both of the high-side instruction signal WH and the low-side instruction signal WL for a pair made up of the upper arm element 23 and the lower arm element 26 which serve as an ON instruction continues at least for the simultaneous ON abnormality determination time, the abnormality detector 55 determines the simul-ON abnormality of a pair made up of the high-side instruction signal WH and the low-side instruction signal WL.

Thereby, the simul-ON abnormalities of a pair made up of the high-side instruction signal UH and the low-side instruction signal UL, of a pair made up of the high-side instruction signal VH and the low-side instruction signal VL, and/or of a pair made up of the high-side instruction signal WH and the low-side instruction signal WL are appropriately detectable.

The rotating electric machine driver 1 is further provided with the custom IC 50 which has the signal amplifier 51 outputting, to the inverter 20, the amplified signals UHG, ULG, VHG, VLG, WHG, WLG that are respectively amplified from the instruction signals UH, UL, VH, VL, WH, WL outputted from the controller 40.

In such manner, switching on-off of the SW 21-26 is appropriately performed according to the amplified signals UHG, ULG, VHG, VLG, WHG, WLG that are respectively amplified to have a voltage level which is capable of driving the SW 21-26.

The custom IC 50 has the U phase protection circuit that stops generation of the amplified signals UHG, ULG when both of a pair made up of the instruction signals UH and UL serve as an ON instruction, the V phase protection circuit that stops generation of the amplified signals VHG, VLG when both of a pair made up of the instruction signals VH and VL serve as an ON instruction, and the W phase protection circuit that stops generation of the amplified signals WHG, WLG when both of a pair made up of the instruction signals WH and WL serve as an ON instruction. In such manner, even when the instruction signals UH, UL, VH, VL, WH, WL are abnormal, an excessive electric current is prevented since a pair made up of the upper arm elements 21-23 and the lower arm elements 24-26 will not be simultaneously switched on.

According to the present embodiment, the abnormality detector 55 is disposed in the custom IC 50. That is, the signal amplifier 51 and the abnormality detector 55 are disposed in one custom IC 50. Thereby, the number of parts is reduced.

The controller 40 has the monitor section 43 which determines whether the abnormality detection by the abnormality detector 55 is normal or not (i.e., correctly detected). Thereby, the mis-determination of the abnormality of the instruction signals UH, UL, VH, VL, WH, WL when in fact the abnormality detector 55 is abnormal is prevented.

The electric power steering device 100 of the present embodiment is provided with the above-mentioned rotating electric machine driver 1 and the motor 10 which outputs the assist torque which assists the steering operation of the vehicle driver. In the rotating electric machine driver 1, the misdetection of each of the phase currents Iu, Iv, Iw which is caused by the abnormality of the instruction signals UH, UL, VH, VL, WH, WL is prevented, thereby (i) preventing the unintended behavior of the motor 10 and (ii) diminishing a wrong operation feeling of the driver by an output of the assist torque from the motor 10.

Other Embodiments (a) Abnormality Determination Process

In the above-mentioned embodiment, the simultaneous OFF determination and the simultaneous ON determination (of the two switching elements) are performed in the same step (S202). In other embodiments, the simultaneous OFF determination and the simultaneous ON determination may be performed in separate steps. The same applies to the simultaneous OFF time measurement, the simultaneous ON time measurement, the OFF abnormality determination, and the ON abnormality determination. Further, he simultaneous ON determination, the simultaneous ON time measurement, and the ON abnormality determination may be omitted.

In the above-mentioned embodiment, the abnormality determination threshold value concerning the OFF abnormality determination and the abnormality determination threshold value concerning the ON abnormality determination are the same value. In other embodiments, the threshold value for the OFF abnormality and the threshold value for the ON abnormality may be different values. For example, in the ON abnormality determination, there is no need to take the dead time into consideration unlike the OFF abnormality determination. Therefore, the abnormality determination threshold value used in the ON abnormality determination may have a smaller value than the abnormality determination threshold value used in he OFF abnormality determination.

Although the OFF abnormality determination time and the ON abnormality determination time are respectively measured by the counter in the above-mentioned embodiment, the time measurement may also be performed, for example, by a timer etc. in other embodiments.

In the above-mentioned embodiment, the OFF abnormality determination time and the ON abnormality determination time are set to be equal to or smaller than the ringing convergence time. In other embodiments, the OFF abnormality determination time and the ON abnormality determination time may be set to a time period that is equal to or smaller than the minimum retention time which is a time period from a start of the voltage vector period for a detection of the electric current by the electric current detector to an (actual) electric current detection timing.

(b) Electric Current Detector

In the above-mentioned embodiment, the detected current value (e.g., the detected current value Ic) is detected in one cycle of the carrier signal during the active voltage vector period which enables a detection of the electric current in different phases. That is, the detected current value is detected twice in one cycle of the carrier signal.

In other embodiments, the electric detected current value may be detected, in one cycle of the electric current calculation, i.e., according to an electric current calculation cycle of the electric current calculator, based on the active voltage vector, which enables a detection of the electric current in two different phases. For example, when the calculation of each of the phase currents is performed by the electric current calculator every two cycles of the carrier signal, it may be configured to perform the electric current detection once in every cycle of the carrier signal. Further, for example, when the calculation of each of the phase currents is performed by the electric current calculator in every four cycles of the carrier signal, it may be configured to perform the electric current detection once in every two cycles of the carrier signal.

In the above-mentioned embodiment, the electric current detector is disposed at a position between the inverter section and the negative side of the power supply. In other embodiments, the electric current detector may be disposed at a position between the inverter section and the positive side of the power supply.

Further, for example, as shown in FIG. 7, the electric current detector may be provided in every phase. Even when the electric current detector is disposed in every phase, the abnormalities of the instruction signal are appropriately detectable.

(c) Instruction Signal Generator

In the above-mentioned embodiment, the neutral point voltage of the instruction signal is changed for the former period of one cycle of the carrier signal and for the latter period of one cycle of the carrier signal. In other embodiments, the neutral point voltage may be not changed in one cycle of the carrier signal. Further, according to the electric current detection cycle, the neutral point voltage may be changed for every cycle of the electric current detection.

Further, a compensation process etc. may be performed for reserving the required amount of the minimum retention time for securely detecting the electric current.

Furthermore, in the above-mentioned embodiment, the carrier signal is a chopping wave signal. In other embodiments, the carrier signal may be any signal, e.g. a saw tooth wave signal or the like.

(d) Abnormality Detector

In the above-mentioned embodiment, the abnormality detector is disposed in the same driver circuit as the signal amplifier. In other embodiments, the abnormality detector may be disposed in a different circuit that is different from the signal amplifier. Further, the abnormality detector may preferably be comprised of a different circuit that is different from the controller (section) for the reasons regarding the functional safety.

(e) Rotating Electric Machine Driver

In the above-mentioned embodiment, a rotating electric machine driver is applied to the electric power steering device. In other embodiments, the rotating electric machine driver may be applied to a device other than the electric power steering device.

Although the present disclosure has been fully described in connection with preferred embodiment thereof with reference to the accompanying drawings, it is to be noted that various changes and modifications are apparent to those skilled in the art, and such changes, modifications, and summarized schemes are to be understood as being within the scope of the present disclosure as defined by appended claims.

What is claimed is:

1. A rotating electric machine driving apparatus comprising:
   an inverter section having an upper arm element and a lower arm element respectively corresponding to each of plural phases of a winding wire of a rotating electric machine, the upper arm element disposed on a high voltage side of the upper arm element and the lower arm element disposed on a low voltage side of the upper arm element;
   an electric current detector detecting an electric current supplied to the winding wire;
   a controller section obtaining a detected current value detected by the electric current detector and generating a high-side instruction signal and a low-side instruction signal respectively that switch an ON-OFF of the upper arm element and the lower arm element based on the detected current value; and
   an abnormality detector determining a simul-OFF abnormality, in which a high-side and low-side instruction signal pair for an upper arm and lower arm element pair simultaneously becomes an OFF instruction, based on continued switching-OFF of the high-side and low-side instruction signal pair continuing for at least a simul-OFF abnormality determination time; wherein
   the simul-OFF abnormality determination time is longer than a dead time, during which both the upper arm element and the lower arm element are simultaneously switched to avoid a simul-ON of the upper arm element and the lower arm element, and
   the simul-OFF abnormality determination time is equal to or shorter than a minimum retention time, which is a duration between a start of a voltage vector period for a detection of an electric current by the electric current detector and an electric current detection timing.

2. The rotating electric machine driving apparatus of claim 1, wherein
   the abnormality detector determines a simul-ON abnormality, which is an abnormality caused by the high-side and low-side instruction signal pair being simultaneously switched ON based on a condition that a switching on of the high-side and low-side instruction signal pair continues at least for a simul-ON abnormality determination time.

3. The rotating electric machine driving apparatus of claim 1, further comprising:
   a driver circuit having a signal amplifier that outputs an amplified signal to the inverter section, the amplified signal being derived from amplification of an instruction signal that is output from the controller section.

4. The rotating electric machine driving apparatus of claim 3, further comprising:
   a protection section in the driver circuit that stops a generation of the amplified signal when both of the upper arm instruction signal and the lower arm instruction signal have an ON instruction.

5. The rotating electric machine driving apparatus of claim 3, wherein
   the abnormality detector is disposed in the driver circuit.

6. The rotating electric machine driving apparatus of claim 1, wherein
   the electric current detector is disposed at a position between (i) the inverter section and (ii) a positive side or a negative side of a power source.

7. The rotating electric machine driving apparatus of claim 1, further comprising:
   a monitor section in the controller section determining whether detection of abnormality by the abnormality detector is correctly detected.

* * * * *